United States Patent
Robb et al.

(10) Patent No.: US 7,584,791 B2
(45) Date of Patent: Sep. 8, 2009

(54) METHODS FOR REDUCING THE VISCOSITY OF TREATMENT FLUIDS COMPRISING DIUTAN

(75) Inventors: Ian D. Robb, Duncan, OK (US); Richard W. Pauls, Duncan, OK (US); Lulu Song, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 45 days.

(21) Appl. No.: 11/703,949

(22) Filed: Feb. 8, 2007

(65) Prior Publication Data

US 2008/0190609 A1  Aug. 14, 2008

(51) Int. Cl.
*E21B 43/27* (2006.01)
(52) U.S. Cl. ......................... 166/279; 507/90
(58) Field of Classification Search ................. 166/279; 507/90
See application file for complete search history.

(56) References Cited

U.S. PATENT DOCUMENTS

| | | | |
|---|---|---|---|
| 5,175,278 A | 12/1992 | Peik et al. | 536/123 |
| 5,361,856 A | 11/1994 | Surjaatmadja et al. | 175/67 |
| 5,413,178 A | 5/1995 | Walker et al. | 166/300 |
| 5,494,103 A | 2/1996 | Surjaatmadja et al. | 166/222 |
| 5,582,249 A | 12/1996 | Caveny et al. | 166/276 |
| 5,759,964 A | 6/1998 | Shuchart et al. | 507/209 |
| 5,765,642 A | 6/1998 | Surjaatmadja | 166/297 |
| 5,775,425 A | 7/1998 | Weaver et al. | 166/276 |
| 5,787,986 A | 8/1998 | Weaver et al. | 166/280 |
| 5,833,000 A | 11/1998 | Weaver et al. | 166/276 |
| 5,853,048 A | 12/1998 | Weaver et al. | 166/279 |
| 6,110,271 A | 8/2000 | Skaggs et al. | 106/804 |
| 6,547,871 B2 | 4/2003 | Chatterji et al. | 106/672 |
| 6,632,779 B1 | 10/2003 | Vollmer et al. | 507/211 |
| 6,668,926 B2 | 12/2003 | Nguyen et al. | 166/280 |

(Continued)

FOREIGN PATENT DOCUMENTS

EP  0520775 A1  6/1992

(Continued)

OTHER PUBLICATIONS

Diltz, et al., "Location of O-acetyl groups in S-657 using the reductive-cleavage method," Carbohydrate Research 331 (2001), pp. 265-270.

(Continued)

*Primary Examiner*—William P Neuder
(74) *Attorney, Agent, or Firm*—Robert A. Kent; Baker Botts L.L.P.

(57) ABSTRACT

Methods are provided that include a method comprising providing a treatment fluid comprising a base fluid and a gelling agent that comprises a diutan composition; providing a breaker that comprises an acid composition; allowing the breaker to interact with the treatment fluid; and allowing the viscosity of the treatment fluid to decrease. In some embodiments, the treatment fluid may comprise a base fluid, a gelling agent that comprises a diutan composition, and a breaker that comprises an acid composition. In some embodiments, the treatment fluid may be introduced into a portion of the subterranean formation at or above a pressure sufficient to create or enhance one or more fractures in the portion of the subterranean formation. Additional methods are also provided.

16 Claims, 4 Drawing Sheets

U.S. PATENT DOCUMENTS

| | | | |
|---|---|---|---|
| 6,729,404 B2 | 5/2004 | Nguyen et al. | 166/280.2 |
| 6,877,563 B2 | 4/2005 | Todd et al. | 166/312 |
| 6,962,200 B2 | 11/2005 | Nguyen et al. | 166/280.2 |
| 7,021,383 B2 | 4/2006 | Todd et al. | 166/307 |
| 7,131,491 B2 | 11/2006 | Blauch et al. | 166/276 |
| 7,159,659 B2 | 1/2007 | Welton et al. | 166/307 |
| 2003/0166472 A1 | 9/2003 | Pursley et al. | 507/200 |
| 2005/0261138 A1 | 11/2005 | Robb et al. | 507/209 |
| 2006/0121578 A1 | 6/2006 | Bower et al. | 435/85 |
| 2006/0131012 A1 | 6/2006 | Blauch et al. | 166/249 |
| 2006/0166836 A1* | 7/2006 | Pena et al. | 507/211 |
| 2006/0166837 A1 | 7/2006 | Lin et al. | 507/211 |
| 2006/0178276 A1 | 8/2006 | Pena et al. | 507/211 |
| 2006/0180309 A1 | 8/2006 | Welton et al. | 166/282 |
| 2006/0180310 A1 | 8/2006 | Welton et al. | 166/283 |
| 2006/0183646 A1 | 8/2006 | Welton et al. | 507/259 |
| 2006/0199201 A1 | 9/2006 | Harding et al. | 435/6 |
| 2006/0243449 A1 | 11/2006 | Welton et al. | 166/307 |
| 2006/0247135 A1 | 11/2006 | Welton et al. | 507/213 |
| 2007/0281868 A1* | 12/2007 | Pauls et al. | 507/213 |

FOREIGN PATENT DOCUMENTS

WO   WO 2006/117517 A2   11/2006

OTHER PUBLICATIONS

Eoff, et al., "Development of a Hydrophobically Modified Water-Soluble Polyumer as a Selective Bullhead System for Water-Production Problems," SPE 80206, pp. 1-9, 2003.

Chowdhury, et al., "Structural Studies of an extracellular polysaccharide, S-657, elaborated by *Xanthomonas* ATCC 53159," Carbohydrate Research, 164 (1987), pp. 117-122.

Lee, et al., "X-Ray and computer modeling studies on gellan-related polymers: Molecular structures of welan, S-657, and rhamsan," Carbohydrate Research, 214 (1991), pp. 11-24.

Search Report and Written Opinion of International Application No. PCT/GB2008/000475, Feb. 8, 2008.

* cited by examiner

METHODS FOR REDUCING THE VISCOSITY OF TREATMENT FLUIDS COMPRISING DIUTAN

BACKGROUND

The present invention relates to methods and compositions for use in industrial, oilfield, and/or subterranean operations. More particularly, the present invention relates to methods of reducing the viscosity of treatment fluids that comprise a gelling agent comprising a diutan composition, and utilizing breakers that comprise an acid composition.

Treatment fluids may be used in a variety of subterranean treatments, including, but not limited to, stimulation treatments, damage removal, formation isolation, wellbore cleanout, scale removal, scale control, drilling operations, cementing, conformance treatments, and sand control treatments. Treatment fluids may also be used in a variety of pipeline treatments. As used herein, the term "treatment," or "treating," refers to any operation that uses a fluid in conjunction with a desired function and/or for a desired purpose. The term "treatment," or "treating," does not imply any particular action by the fluid or any particular component thereof.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The treatment fluid may comprise particulates, often referred to as "proppant particulates," that are deposited in the fractures. The proppant particulates, inter alia, may prevent the fractures from fully closing upon the release of hydraulic pressure, forming conductive channels through which fluids may flow to the well bore. The proppant particulates also may be coated with certain types of materials, including resins, tackifying agents, and the like, among other purposes, to enhance conductivity (e.g., fluid flow) through the fractures in which they reside. Once at least one fracture is created and the proppant particulates are substantially in place, the treatment fluid may be "broken" (i.e., the viscosity of the fluid is reduced), and the treatment fluid may be recovered from the formation.

Treatment fluids are also utilized in sand control treatments, such as gravel packing. In "gravel-packing" treatments, a treatment fluid suspends particulates (commonly referred to as "gravel particulates"), and deposits at least a portion of those particulates in a desired area in a well bore, e.g., near unconsolidated or weakly consolidated formation zones, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation (e.g., a propped fracture) into a well bore. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation sand from occluding the screen or migrating with the produced hydrocarbons, and the screen acts, inter alia, to prevent the particulates from entering the well bore. The gravel particulates also may be coated with certain types of materials, including resins, tackifying agents, and the like, among other purposes, to enhance conductivity (e.g., fluid flow) through the gravel pack in which they reside. Once the gravel pack is substantially in place, the viscosity of the treatment fluid may be reduced to allow it to be recovered. In some situations, fracturing and gravel-packing treatments are combined into a single treatment (commonly referred to as "FracPac™" operations). In such "frac pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in these treatment fluids is important for a number of reasons. Maintaining sufficient viscosity is important in fracturing and sand control treatments for particulate transport and/or to create or enhance fracture width. Also, maintaining sufficient viscosity may be important in acid treatments, in friction reduction and to control and/or reduce fluid loss into the formation. Moreover, a treatment fluid of a sufficient viscosity may be used to divert the flow of fluids present within a subterranean formation (e.g., formation fluids, other treatment fluids) to other portions of the formation, for example, by invading the higher permeability portions of the formation with a fluid that has high viscosity at low shear rates. At the same time, while maintaining sufficient viscosity of the treatment fluid often is desirable, it also may be desirable to reduce the viscosity at a particular time, inter alia, for subsequent recovery of the fluid from the formation.

To provide the desired viscosity, polymeric gelling agents may be added to the treatment fluids. Examples of commonly used polymeric gelling agents include, but are not limited to, biopolymers, polysaccharides such as guar gums and derivatives thereof, cellulose derivatives, synthetic polymers, and the like. These gelling agents, when hydrated and at a sufficient concentration, are capable of forming a viscous solution. When used to make an aqueous-based viscosified treatment fluid, a gelling agent is combined with an aqueous fluid and the soluble portions of the gelling agent are dissolved in the aqueous fluid, thereby increasing the viscosity of the fluid. To further increase the viscosity of a treatment fluid, often the molecules of the gelling agent are "crosslinked" with the use of a crosslinking agent. Conventional crosslinking agents usually comprise a metal complex or compound that interacts with at least two polymer molecules to form a "crosslink" between them.

At some point in time, e.g., after a viscosified treatment fluid has performed its desired function, the viscosity of the viscosified treatment fluid should be decreased. This is often referred to as "breaking the gel" or "breaking the fluid." This can occur by, inter alia, reversing the crosslink between crosslinked polymer molecules, breaking down the molecules of the polymeric gelling agent, or breaking the crosslinks between polymer molecules. The use of the term "break" herein incorporates at least all of these mechanisms. As used herein, the term "viscosified treatment fluid" refers to a treatment fluid that has had its viscosity increased by a diutan composition or any other means. Certain breakers that are capable of breaking viscosified treatment fluids comprising crosslinked gelling agents are known in art. For example, breakers comprising sodium bromate, sodium chlorite, sodium persulfate, ammonium persulfate, sodium hypochlorite, lithium hypochlorite, sodium perborate, and other oxidizing agents have been used to reduce the viscosity of treatment fluids comprising crosslinked polymers. Examples of such breakers are described in U.S. Pat. Nos. 5,759,964 to Shuchart, et al., and 5,413,178 to Walker, et al., the relevant disclosures of which are herein incorporated by reference.

While oxidizing agents may be effective to at least partially break treatment fluids comprising a diutan composition, the use of oxidizing breakers in combination with diutan may interfere with a subterranean formation's ability to regain a desired level of permeability. This may be due in part to residual treatment fluids or reaction products that remain in the formation after the treatment fluid is broken. In particular, it is believed that oxidizing agents may not substantially degrade or otherwise reduce the presence of diutan-producing bacterial bodies in the subterranean formation. These bacterial bodies are thought to be at least partially responsible for creating a physical barrier in the formation which reduces permeability. Additionally, the use of oxidizing agents to break treatment fluids comprising a diutan composition may be problematic at temperatures above about 200° F., because oxidizing breakers may degrade the treatment fluid too quickly for the treatment fluid to suspend proppant particulates for a desired length of time, e.g., the length of time necessary for the treatment fluid to transport the proppant particulates to a desired place in the formation. In particular, a treatment fluid that is gelled with diutan and contains an oxidizing breaker may not be able to adequately suspend particulates for a desired length of time, e.g. more than about two hours.

SUMMARY

The present invention relates to methods and compositions for use in industrial, oilfield, and/or subterranean operations. More particularly, the present invention relates to methods of reducing the viscosity of treatment fluids that comprise a gelling agent comprising a diutan composition, and utilizing breakers that comprise an acid composition.

In one embodiment, the present invention provides a method comprising providing a treatment fluid comprising a base fluid and a gelling agent that comprises a diutan composition; providing a breaker that comprises an acid composition; allowing the breaker to interact with the treatment fluid; and allowing the viscosity of the treatment fluid to decrease.

In another embodiment, the present invention provides a method comprising providing a treatment fluid that comprises a base fluid, a gelling agent that comprises a diutan composition, and a breaker that comprises an acid composition; introducing the treatment fluid into at least a portion of the subterranean formation; and allowing the viscosity of the treatment fluid to decrease.

In yet another embodiment, the present invention provides a method comprising providing a treatment fluid that comprises a base fluid and a gelling agent that comprises a diutan composition; providing a breaker that comprises an acid composition; introducing the treatment fluid into a portion of the subterranean formation at or above a pressure sufficient to create or enhance one or more fractures in the portion of the subterranean formation; allowing the breaker to interact with the treatment fluid; and allowing the viscosity of the treatment fluid to decrease.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
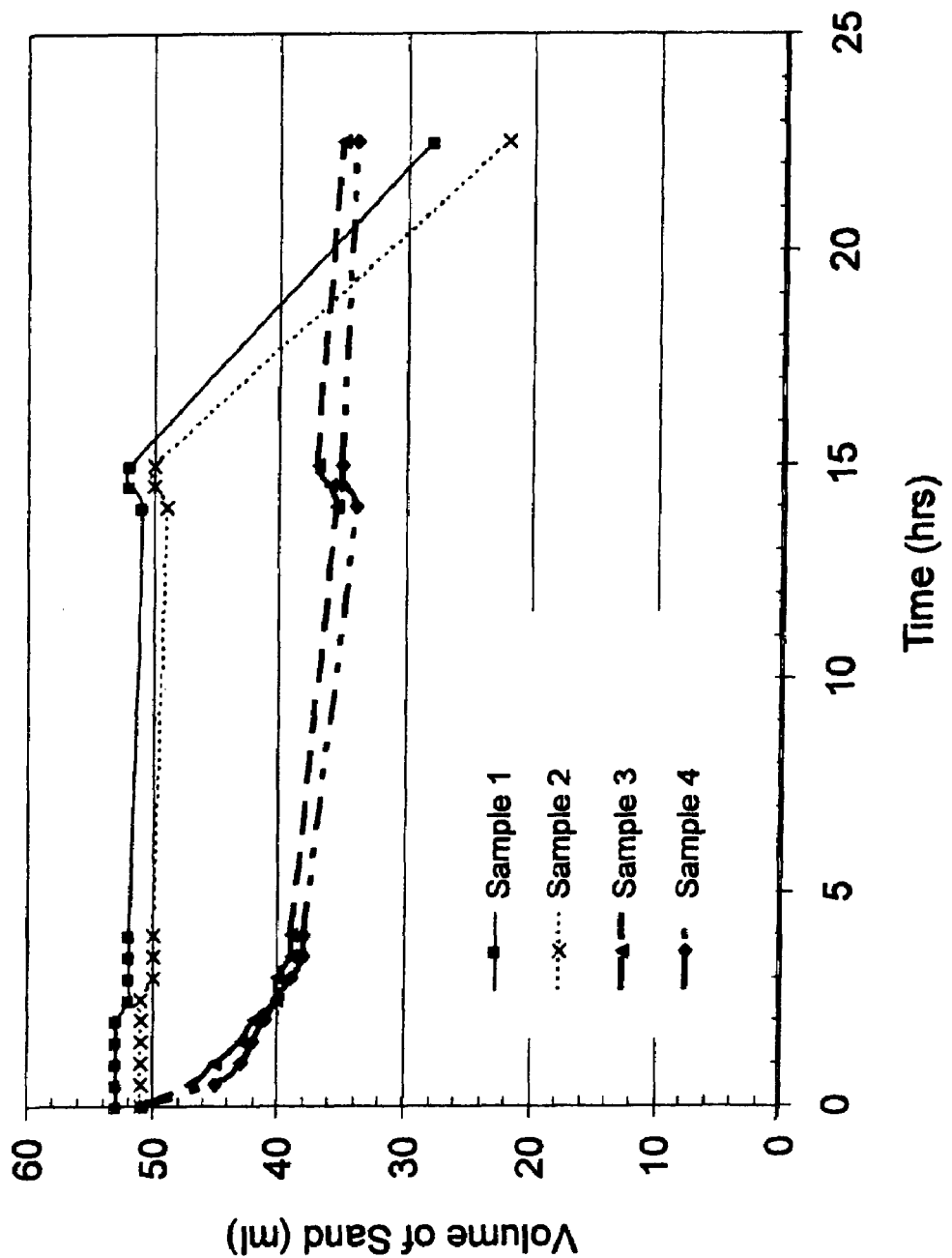
FIG. 1 illustrates proppant suspension data of various treatment fluids, including certain embodiments of the treatment fluids of the present invention.

The present invention relates to methods and compositions for use in industrial, oilfield, and/or subterranean operations. More particularly, the present invention relates to methods of reducing the viscosity of treatment fluids that comprise a gelling agent comprising a diutan composition, and utilizing breakers that comprise an acid composition.

While the compositions and methods of the present invention may be suitable for use in a variety of subterranean treatments, they may be particularly useful in treatments for subterranean formations comprising elevated temperatures, such as those above 200° F. One of the many advantages of the present invention is that it may allow for a controlled decrease in the viscosity of a viscosified treatment fluid. In some embodiments, a breaker of the present invention may be able to break a treatment fluid comprising a diutan composition at temperatures above 200° F., while providing satisfactory proppant suspension for a desired minimum period of time, e.g. two hours, after the breaker contacts the treatment fluid. Furthermore, in some embodiments, when the viscosified treatment fluid is broken, decreased levels of residue may be present as compared to traditional viscosified treatment fluids.

The treatment fluids of the present invention generally comprise a base fluid, a gelling agent that comprises a diutan composition, and a breaker that comprises an acid composition. Alternatively, in certain embodiments, the treatment fluids of the present invention may be allowed to interact with a breaker that is not a component of the treatment fluid.

The gelling agents suitable for use in the methods of the present invention comprise a diutan composition. The term "diutan composition" as used herein, refers to a gelling agent that may comprise diutan, clarified diutan, or combinations thereof. In general, diutan is a polysaccharide which may be prepared by fermentation of a strain of sphingomonas. Diutan may also be referred to as a polysaccharide designated S-657 or S-8 in some literature. Its structure has been elucidated as having a repeat unit of a hexasaccharide with a tetrasaccharide repeat unit in the backbone that comprises glucose and rhamnose units and a di-rhamnose side chain. It is believed to have thickening, suspending, and stabilizing properties in aqueous and/or nonaqueous solutions. Details of the diutan gum structure may be found in an article by Diltz et al., "Location of O-acetyl Groups in S-657 Using the Reductive-Cleavage Method," CARBOHYDRATE RESEARCH, Vol. 331, p. 265-

270 (2001), which is hereby incorporated by reference in its entirety. Details of preparing diutan gum may be found in U.S. Pat. No. 5,175,278, which is hereby incorporated by reference in its entirety.

The term "clarified diutan" as used herein refers to a diutan that has improved turbidity and/or filtration properties as compared to nonclarified diutan. In some embodiments, suitable clarified diutans may have been treated with enzymes or the like to remove residual cellular structures, such as cell walls. In some embodiments, suitable clarified diutans may be produced from genetically modified or bioengineered strains of bacteria or other strains of bacteria that allow the clarified diutan to have improved functional properties such as filterability, turbidity, etc. In one embodiment, the clarified diutan may be modified by genetic engineering or bacteria selection or the result of chemical treatment or derivatization of a diutan. An example of such a modification would be where a portion of the diutan is oxidized or hydrolyzed. Suitable clarified diutan may also be present in a form that will only partially hydrate or will not hydrate at ambient temperature. This form of clarified diutan may be chemically modified, chemically coated, genetically modified, or produced from a new strain of bacteria.

A suitable source of a diutan composition is "GEOVIS XT," which is commercially available from Kelco Oil Field Group, Houston, Tex. Another suitable source of a diutan composition is "FDP-S848-07" and "FDP-S849-07," both of which are available from Halliburton Energy Services, Duncan, Okla. Other examples of suitable sources of a diutan composition may include those disclosed in U.S. Pat. No. 5,175,278 and U.S. Patent Application Nos. 2006/0121578, 2006/0199201, 2006/0166836, 2006/0166837, and 2006/0178276, the relevant disclosures of which are herein incorporated by reference.

The gelling agent comprising diutan may be provided in any form that is suitable for the particular treatment fluid and/or application of the present invention. In certain embodiments, the gelling agent may be provided as a liquid, gel, suspension, and/or solid additive that is admixed or incorporated into a treatment fluid used in conjunction with the present invention. The gelling agent may also be present in a solid particulate form of any size or shape. For example, larger sized particulates of spherical shape may be used, inter alia, to form perforation tunnel blocking particles, similar to perforation pack balls. Similarly, smaller sized particulates may be used, inter alia, as a fluid loss control material that may act to bridge natural fractures or other channels. The gelling agent should be present in a treatment fluid suitable for use in the present invention in an amount sufficient to impart the desired viscosity (e.g., sufficient viscosity to divert flow, reduce fluid loss, suspend particulates, provide friction reduction, etc.) to a treatment fluid. More specifically, in some embodiments, the amount of gelling agent used in the treatment fluids suitable for use in the present invention may vary from about 0.25 pounds per 1000 gallons of treatment fluid ("lbs/Mgal") to about 200 lbs/Mgal. In other embodiments, the amount of gelling agent included in the treatment fluids suitable for use in the present invention may vary from about 30 lbs/Mgal to about 80 lbs/Mgal. In another embodiment, about 60 lbs/Mgal of a gelling agent is included in a treatment fluid suitable for use in the present invention. It should be noted that in well bores comprising bottom hole temperatures of 200° F. or more, 70 lbs/Mgal or more of the gelling agent may be beneficially used in a treatment fluid suitable for use in the present invention. In embodiments in which the amount of diutan composition approaches 200 lbs/Mgal, the diutan composition may act to increase the viscosity of the treatment fluid so that the treatment fluid may be used as a diverting fluid, fluid loss pill to seal a formation, or as a chemical pig in a pipeline.

In some embodiments, the gelling agents suitable for use in the methods of the present invention may comprise a clarified diutan, wherein the clarified diutan at a 0.1% concentration in deionized water, in a 1 cm optical cell, has a transmittance at 600 nanometers ("nm") wavelength of at least about 65%. In some embodiments, the clarified diutan may have a transmittance of at least about 75%. In some embodiments, the clarified diutan may have a transmittance of at least about 85%. One of ordinary skill in the art with the benefit of this disclosure will recognize that the transmittance of any particular treatment fluid may also vary depending on the addition of certain additives, the composition of the treatment fluid, the degree of hydration of the diutan composition, the temperature, and the pH of the treatment fluid.

In some embodiments, the gelling agents suitable for use in the methods of the present invention may comprise a clarified diutan, wherein the clarified diutan at a 0.1% concentration in deionized water, in a 1 cm optical cell, has a transmittance at 350 nanometers ("nm") wavelength of at least about 20%. In some embodiments, the clarified diutan has a transmittance of at least about 25%. In some embodiments, the clarified diutan has a transmittance of at least about 30%. In some embodiments, the clarified diutan has a transmittance of at least about 40%. In some embodiments, the clarified diutan has a transmittance of at least about 50%. In some embodiments, the clarified diutan has a transmittance of at least about 60%. In some embodiments, the clarified diutan has a transmittance of at least about 70%. In some embodiments, the clarified diutan has a transmittance of at least about 80%. In some embodiments, the clarified diutan has a transmittance of at least about 90%. One of ordinary skill in the art with the benefit of this disclosure will recognize that the transmittance of any particular treatment fluid may also vary depending on the addition of certain additives, the composition of the treatment fluid, the degree of hydration of the diutan composition, the temperature, and the pH of the treatment fluid.

In other embodiments, a treatment fluid suitable for use in the present invention comprising clarified diutan in an amount of 42 lbs/Mgal in a sodium bromide brine having a density of 11.5 pounds per gallon (ppg) may have a fluid loss greater than about 30 grams in 5 minutes at ambient temperature in a filtering laboratory test on a Baroid Filter Press using 40 psi of differential pressure and a 11 cm Whatman #50 filter paper having a 2.7µ pore size. In some embodiments, a treatment fluid suitable for use in the present invention comprising clarified diutan may have a fluid loss greater than about 35 grams in 5 minutes. In some embodiments, a treatment fluid suitable for use in the present invention comprising clarified diutan may have a fluid loss greater than about 40 grams in 5 minutes. In some embodiments, a treatment fluid suitable for use in the present invention comprising clarified diutan may have a fluid loss greater than about 45 grams in 5 minutes.

In other embodiments, a treatment fluid suitable for use in the present invention comprising clarified diutan in an amount of 42 lbs/Mgal in a sodium bromide brine having a density of 11.5 pounds per gallon (ppg) may have a fluid loss greater than about 145 grams in 5 minutes at ambient temperature in a filtering laboratory test on a Baroid Filter Press using 40 psi of differential pressure and a 11 cm Whatman #2 filter paper having a 8µ pore size. In some embodiments a treatment fluid suitable for use in the present invention comprising clarified diutan may have a fluid loss greater than about 150 grams in 5 minutes. In some embodiments, a treatment fluid suitable for use in the present invention comprising clarified diutan may have a fluid loss greater than about 155 grams in 5 minutes. In some embodiments, a treatment fluid suitable for use in the present invention comprising clarified diutan may have a fluid loss greater than about 160 grams in 5 minutes.

In other embodiments, a treatment fluid suitable for use in the present invention comprising clarified diutan in an amount of 42 lbs/Mgal in a sodium bromide brine having a density of 11.5 pounds per gallon (ppg) may have a fluid loss greater than about 115 grams in 2.5 minutes at ambient temperature in a filtering laboratory test on a Baroid Filter Press using 40 psi of differential pressure and a 11 cm Whatman #2 filter paper having a 8μ pore size. In some embodiments, a treatment fluid suitable for use in the present invention comprising clarified diutan may have a fluid loss greater than about 120 grams in 2.5 minutes. In some embodiments, a treatment fluid suitable for use in the present invention comprising clarified diutan may have a fluid loss greater than about 130 grams in 2.5 minutes. In some embodiments, a treatment fluid suitable for use in the present invention comprising clarified diutan may have a fluid loss greater than about 140 grams in 2.5 minutes. One of ordinary skill in the art with the benefit of this disclosure will recognize that the filtration rate of any particular treatment fluid of the present invention may also vary depending on the addition of certain additives, the composition of the treatment fluid, the degree of hydration of the diutan composition, the temperature, and the pH of the treatment fluid.

Optionally, the treatment fluids suitable for use in the methods of the present invention may comprise an additional gelling agent if the use of the diutan and the gelling agent produces a desirable result, e.g., a synergistic effect. In some embodiments, diutan may be used in combination with other gelling agents so that the duitan only imparts its viscosity once the treatment fluid has entered the formation to provide viscosity at elevated temperatures where other gelling agents may no longer provide adequate viscosity. Suitable additional gelling agents may include polysaccharides and galactomannan gums. Depending on the application, one gelling agent may be more suitable than another. One of ordinary skill in the art with the benefit of this disclosure will be able to determine if an additional gelling agent should be included for a particular application based on, for example, the desired viscosity of the treatment fluid and the bottom hole temperature ("BHT") of the well bore.

The breakers suitable for use in the present invention generally comprise an acid composition. The acid composition may be present in the treatment fluid in an amount sufficient to decrease the viscosity of a treatment fluid comprising a gelling agent that comprises a diutan composition. The amount and composition of the acid composition utilized in the present invention may depend upon a number of factors, including the composition and/or temperature of the formation, the type and/or amount of gelling agents used, the type and/or amount of crosslinking agent used if any, the pH of the treatment fluid, the pH buffering properties of substances native to a subterranean formation in which the treatment fluid is used, and the like. If reaction time is a concern, holding all other factors constant, generally the viscosity of the treatment fluid may decrease at a faster rate as the concentration of the acid composition in the breaker is increased (e.g., as the pH is lowered).

The acid compositions of the present invention may comprise an acid, an acid generating compound, and combinations thereof. Examples of acids that may be suitable for use in the present invention include, but are not limited to organic acids, e.g., formic acids, acetic acids, carbonic acids, citric acids, glycolic acids, lactic acids, ethylenediaminetetraacetic acid ("EDTA"), hydroxyethyl ethylenediamine triacetic acid ("HEDTA"), and the like, inorganic acids, e.g., hydrochloric acid, hydrofluoric acid, p-toluenesulfonic acid, and the like, and combinations thereof.

Examples of acid generating compounds that may be suitable for use in the present invention include, but are not limited to, esters, aliphatic polyesters, ortho esters, which may also be known as ortho ethers, poly (ortho esters), which may also be known as poly(ortho ethers), poly(lactides), poly (glycolides), poly(ε-caprolactones), poly(hydroxybutyrates), poly(anhydrides), or copolymers thereof. Derivatives and combinations also may be suitable. The term "copolymer" as used herein is not limited to the combination of two polymers, but includes any combination of polymers, e.g., terpolymers and the like. Other suitable acid-generating compounds include: esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Other suitable materials may be disclosed in U.S. Pat. Nos. 6,877,563 and 7,021,383, the disclosures of which are incorporated by reference.

In those embodiments where an acid generating compound is used in the breaker, the acid generating compound may generate an acid downhole in a delayed fashion. The acid generating compounds may be reacted with small amounts of reactive materials such as mineral acids, organic acids, acidic anhydrides, and the like to lower the pH to accelerate the hydrolysis of the acid generating compound if desired. The acid generating compound also may generate alcohols downhole that may be beneficial to the operation. Additionally, these alcohols may be used to at least partially remove condensate blocks, or move or prevent water blocks in the formation. These alcohols may also act as hydrate inhibitors. Delayed generation of these alcohols can be beneficial in other ways as well. For instance, the production of these alcohols downhole may give the distinct advantage of being able to provide the alcohols downhole without having to pump them. This may be beneficial, for example, in some areas, where it may be problematic to pump an alcohol (e.g., when the environment has a temperature that is greater than the flash point of the alcohol or when environmental or cultural regulations do not permit the pumping of such alcohols), the delayed generation may be useful. Also, these generated alcohols may be preferred over standard alcohols because some standard alcohols contain chemical inhibitors that may interact with the chemistry within the well bore in such a way as to be problematic. Moreover, shipping and storing standard alcohols may be problematic. The particular alcohol given off depends on the acid generating compound being used. For instance, trimethylorthoformate gives off three molecules of methanol for each molecule of formic acid; the methanol may be useful for hydrate inhibition.

In preferred embodiments, the treatment fluids of the present invention may comprise a pH-adjuster. The pH-adjuster may be present in the treatment fluids suitable for use in the present invention in an amount sufficient to maintain and/or adjust the pH of the fluid. In some embodiments, the pH-adjuster may be present in an amount sufficient to maintain and/or adjust the pH of the fluid to a pH in the range of from about 1 to about 5. In other embodiments, the pH-adjuster may be present in an amount sufficient to maintain and/or adjust the pH of the fluid to a pH in the range of from about 1 to about 4, or in the range of from about 2 to about 4. In general, a pH-adjuster may function, inter alia, to affect the hydrolysis rate of the gelling agent. In some embodiments, a pH-adjuster may be included in the treatment fluid, inter alia, to adjust the pH of the treatment fluid to, or maintain the pH of the treatment fluid near, a pH that balances the duration of certain properties of the treatment fluid (e.g. the ability to suspend proppant) with the ability of the breaker to reduce the viscosity of the treatment fluid and/or a pH that will result in a decrease in the viscosity of the treatment fluid such that it does not hinder production of hydrocarbons from the formation. In certain embodiments, the pH-adjuster comprises a salt of an organic acid such as sodium or potassium formate, sodium or potassium acetate, sodium or potassium citrate, sodium or potassium glycolate, sodium or potassium maleate, sodium or potassium phosphate, potassium dihydrogen phosphate, cesium formate, combinations thereof, derivatives thereof, and the like. In some embodiments, the pH-adjuster may comprise a small amount of a strong base such as NaOH, $Na_2CO_3$, and $Mg(OH)_2$. In other embodiments, the pH-adjuster may be any other substance known in the art capable of maintaining the pH of the breaker in a limited range. One of ordinary skill in the art, with the benefit of this disclosure, will recognize the appropriate pH-adjuster and amount thereof to use for a chosen application.

In certain embodiments of the present invention, the breaker may comprise a combination of an acid composition and an "additional breaker component," which herein refers to any other breaker known in the art that does not negatively impact the acid component of the breaker composition. Examples of suitable additional breakers include, but are not limited to, sodium chlorite, sodium bromate, and the like. In certain embodiments of the present invention, the breaker may be formulated to remain inactive until it is "activated" by, among other things, certain conditions in the fluid (e.g., pH, temperature, etc.) and/or contact with some other substance. In some embodiments, the breaker may be delayed by encapsulation with a coating (e.g., a porous coating through which the breaker may diffuse slowly, or a degradable coating that degrades down hole) that delays the release of the breaker until a desired time or place.

The breaker may interact with the treatment fluids of the present invention in an amount sufficient to provide the desired reduction in the viscosity of the treatment fluid. The amount and composition of the breaker utilized in the present invention may depend upon a number of factors, including the composition and/or temperature of the formation, the type and/or amount of gelling agents used, the particular subterranean treatment, the desired break time of the fluid, the type and/or amount of crosslinking agent used if any, the pH of the treatment fluid, the pH of the breaker, and the like. In embodiments in which the treatment fluid has particulates suspended therein, the amount of breaker used may also depend on the length of time the user desires the treatment fluid to support the particulates. One skilled in the art, with the benefit of this disclosure, will recognize the amount and type of breaker suitable for a particular application of the present invention.

Suitable base fluids for use in the present invention include aqueous base fluids and nonaqueous base fluids. Suitable aqueous base fluids that may be used in the treatment fluids suitable for use in the present invention may include fresh water, salt water, brine, seawater, or any other aqueous fluid that, preferably, does not adversely interact with the other components used in accordance with this invention or with the subterranean formation. The aqueous base fluid preferably is present in the treatment fluids suitable for use in the present invention in an amount sufficient to substantially hydrate the gelling agent. Suitable nonaqueous base fluids that may be used in the treatment fluids suitable for use in the present invention may include glycerol, glycol, polyglycols, ethylene glycol, propylene glycol, and dipropylene glycol methyl ether. Other examples of suitable nonaqueous base fluids that may be used in the present invention are disclosed in U.S. Pat. No. 6,632,779, the relevant disclosure of which is herein incorporated by reference. In some embodiments, the base fluid may be present in the treatment fluids suitable for use in the present invention in an amount in the range from about 5% to 99.99% by volume of the treatment fluid.

In some embodiments, the base fluids suitable for use in the treatment fluids may be foamed (e.g., a liquid that comprises a gas such as nitrogen or carbon dioxide). As used herein, the term "foamed" also refers to co-mingled fluids. In certain embodiments, it may be desirable that the base fluid is foamed to, inter alia, reduce the amount of base fluid that is required, e.g. in water sensitive subterranean formations, to reduce fluid loss to the subterranean formation, enhance flow back of fluids, and/or to provide enhanced proppant suspension. In addition, in certain embodiments where the treatment fluids suitable for use in the present invention are used for fluid diversion, it may be desirable that the treatment be foamed. While various gases can be utilized for foaming the treatment fluids of this invention, nitrogen, carbon dioxide, and mixtures thereof are preferred. In examples of such embodiments, the gas may be present in a treatment fluid suitable for use in the present invention in an amount in the range of from about 5% to about 98% by volume of the treatment fluid, and more preferably in the range of from about 20% to about 80%. The amount of gas to incorporate into the fluid may be affected by factors including the viscosity of the fluid and wellhead pressures involved in a particular application. One example of a foamed fluid suitable for use with the present invention are those disclosed in U.S. patent application Ser. No. 11/506,703, the relevant disclosure of which is herein incorporated by reference.

If desired, the treatment fluids suitable for use in the present invention may also be used in the form of an emulsion. An example of a suitable emulsion would comprise an aqueous base fluid comprising a gelling agent that comprises a diutan composition, and a suitable hydrocarbon. In some embodiments, the emulsion may comprise approximately 30% of an aqueous base fluid and 70% of a suitable hydrocarbon. In some embodiments, the external phase of the emulsion would be aqueous. In certain embodiments, it may be desirable to use an emulsion to, inter alia, reduce fluid loss to the subterranean formation, and/or to provide enhanced proppant suspension. Other benefits and advantages to using emulsions in the methods of the present invention will be evident to one of ordinary skill in the art.

In certain embodiments, the treatment fluids suitable for use in the methods of the present invention also may optionally comprise brines, salts, pH control additives, surfactants, breakers, bactericides, crosslinkers, fluid loss control additives, stabilizers, chelants, scale inhibitors, corrosion inhibitors, hydrate inhibitors, clay stabilizers, salt substitutes (such as trimethyl ammonium chloride), relative permeability modifiers (such as HPT-1™ available from Halliburton Energy Services, Duncan, Okla.), sulfide scavengers, fibers, nanoparticles, combinations thereof, or the like.

In some embodiments, the treatment fluid may comprise a brine. Brines suitable for use in some embodiments of the present invention may include those that comprise monovalent, divalent, or trivalent cations. Some divalent or trivalent cations, such as magnesium, calcium, iron, and zirconium, may, in some concentrations and at some pH levels, cause undesirable crosslinking of a diutan polymer. If a water source is used which contains such divalent or trivalent cations in concentrations sufficiently high to be problematic, then such divalent or trivalent salts may be removed, either by a process such as reverse osmosis, or by raising the pH of the water in order to precipitate out such salts to lower the concentration of such salts in the water before the water is used. Another method would be to include a chelating agent to chemically bind the problematic ions to prevent their undesirable interactions with the diutan. As used herein, the term "chelating agent" or "chelant" also refers to sequestering agents and the like. Suitable chelants include, but are not limited to, citric acid or sodium citrate. Other chelating agents also are suitable. Brines, where used, may be of any weight. Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, mixtures thereof, and the like. The brine chosen should be compatible with the formation and should have a sufficient density to provide the appropriate degree of well control. Additional salts may be added to a water source, e.g., to provide a brine, and a resulting treatment fluid, having a desired density. A preferred suitable brine is seawater. The gelling agents of the present invention may be used successfully with seawater.

Salts may optionally be included in the treatment fluids of the present invention for many purposes, including, for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid suitable for use in the present invention. Suitable salts include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

In some embodiments, the treatment fluid may optionally comprise a chelating agent. When added to the treatment fluids of the present invention, the chelating agent may chelate any dissolved iron (or other divalent or trivalent cation) that may be present in the aqueous fluid. Such chelating may prevent such ions from crosslinking the gelling agent molecules. Such crosslinking may be problematic because, inter alia, it may cause filtration problems, injection problems, and/or cause regain permeability problems. Any suitable chelating agent may be used with the present invention. Examples of suitable chelating agents include, but are not limited to, an anhydrous form of citric acid, commercially available under the tradename "Fe-2™" Iron Sequestering Agent from Halliburton Energy Services, Inc., of Duncan, Okla. Another example of a suitable chelating agent is a solution of citric acid dissolved in water, commercially available under the tradename "Fe-2A™" buffering agent from Halliburton Energy Services, Inc., of Duncan, Okla. Other chelating agents that may be suitable for use with the present invention include, inter alia, nitrilotriacetic acid ("NTA"), any form of ethylene diamine tetracetic acid ("EDTA"), hydroxyethylethylenediaminetriacetic acid ("HEDTA"), dicarboxymethyl glutamic acid tetrasodium salt ("GLDA"), diethylenetriaminepentaacetic acid ("DTPA"), propylenediaminetetraacetic acid ("PDTA"), ethylenediamined(o-hydroxyphenylacetic) acid ("EDDHA"), glucoheptonic acid, gluconic acid, sodium citrate, phosphonic acid, salts thereof, and the like. In some embodiments, the chelating agent may be a sodium or potassium salt. Generally, the chelating agent may be present in an amount sufficient to prevent crosslinking of the gelling agent molecules by any free iron (or any other divalent or trivalent cation) that may be present. In one embodiment, the chelating agent may be present in an amount of from about 0.02% to about 50.0% by weight of the treatment fluid. In another embodiment, the chelating agent is present in an amount in the range of from about 0.02% to about 2.0% by weight of the treatment fluid. One of ordinary skill in the art with the benefit of this disclosure will be able to determine the proper concentration of a chelating agent for a particular application.

In some embodiments, the treatment fluids may include surfactants, e.g., to improve the compatibility of the treatment fluids of the present invention with other fluids (like any formation fluids) that may be present in the well bore. One of ordinary skill in the art with the benefit of this disclosure will be able to identify the type of surfactant as well as the appropriate concentration of surfactant to be used. Suitable surfactants may be used in a liquid or powder form. Where used, the surfactants may be present in the treatment fluid in an amount sufficient to prevent incompatibility with formation fluids, other treatment fluids, or well bore fluids. In an embodiment where liquid surfactants are used, the surfactants are generally present in an amount in the range of from about 0.01% to about 5.0% by volume of the treatment fluid. In one embodiment, the liquid surfactants are present in an amount in the range of from about 0.1% to about 2.0% by volume of the treatment fluid. In embodiments where powdered surfactants are used, the surfactants may be present in an amount in the range of from about 0.001% to about 0.5% by weight of the treatment fluid. Examples of suitable surfactants are non-emulsifiers commercially available from Halliburton Energy Services, Inc., of Duncan, Okla., under the tradenames "LOSURF-259™" nonionic nonemulsifier, "LOSURF-300™" nonionic surfactant, "LOSURF-357™" nonionic surfactant, and "LOSURF-400™" surfactant. Another example of a suitable surfactant is a non-emulsifier commercially available from Halliburton Energy Services, Inc., of Duncan, Okla., under the tradename "NEA-96M™" Surfactant.

In some embodiments, the surfactant may be a viscoelastic surfactant. These viscoelastic surfactants may be cationic, anionic, nonionic, amphoteric, or zwitterionic in nature. The viscoelastic surfactants may comprise any number of different compounds, including methyl ester sulfonates (e.g., as described in U.S. Patent Application Nos. 2006/0180310, 2006/0180309, 2006/0183646 and U.S. Pat. No. 7,159,659, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

It should be noted that, in some embodiments, it may be beneficial to add a surfactant to a treatment fluid suitable for use in the present invention as that fluid is being pumped downhole to help eliminate the possibility of foaming. However, in those embodiments where it is desirable to foam the treatment fluids suitable for use in the present invention, surfactants such as HY-CLEAN (HC-2)™ surface-active suspending agent or AQF-2™ additive, both commercially available from Halliburton Energy Services, Inc., of Duncan, Okla., may be used. Additional examples of foaming agents that may be utilized to foam and stabilize the acidic treatment fluids of this invention include, but are not limited to, betaines, amine oxides, methyl ester sulfonates, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Other suitable surfactants that may or may not be foamers in a particular application that are available from Halliburton Energy Services include: "19N," "G-Sperse Dispersant," "Howco-Suds™" foaming agent, and "A-Sperse™" dispersing aid for acid additives. Other suitable foaming agents and foam stabilizing agents may be included as well, which will be known to those skilled in the art with the benefit of this disclosure.

In other embodiments, it may be desirable to emulsify the treatment fluid with a hydrocarbon, forming a aqueous phase external emulsion. In these embodiments, an emulsifying surfactant would be used. One example of a suitable emulsifying surfactant includes a nonionic surfactant such as a sorbitan ester. SEM-7™ Emulsifier, available from Halliburton Energy Services in Duncan, Okla. is an example of another suitable surfactant. If a surfactant is used, generally an amount from about 0.1% to about 3% based on volume is sufficient. In some embodiments, the emulsion can be mixed and then pumped. In other embodiments, the components can be pumped and then mixed down hole.

Furthermore, in some embodiments, microemulsion additives may optionally be included in the treatment fluids of the present invention. Examples of suitable microemulsion additives include, but are not limited to, "Pen-88M™", surfactant, "Pen-88HT™", surfactant, "SSO-21E" surfactant, "SSO-21MW™" surfactant, GasPerm 1000™ Microemulsion Surfactant/Solvent Additive, which are all commercially available from Halliburton Energy Services, Inc., of Duncan, Okla. Other suitable microemulsion additives are MA-845 additive and MA-844 additive, commercially available from CESI Chemical of Duncan, Okla.; ShaleSurf 1000 additive, commercially available from Frac Tech Services of Aledo, Tex.; and those disclosed in U.S. Patent Application No. 2003/0166472, the relevant disclosure of which is incorporated by reference.

In some embodiments, the treatment fluids suitable for use in the present invention may contain bactericides, inter alia, to protect both the subterranean formation as well as the treatment fluid from attack by bacteria. Such attacks may be problematic because they may lower the viscosity of the treatment fluid, resulting in poorer performance, such as poorer sand suspension properties, for example. Any bactericides known in the art are suitable. An artisan of ordinary skill with the benefit of this disclosure will be able to identify a suitable bactericide and the proper concentration of such bactericide for a given application. Where used, such bactericides are present in an amount sufficient to destroy all bacteria that may be present. Examples of suitable bactericides include, but are not limited to, a 2,2-dibromo-3-nitrilopropionamide, commercially available under the tradename "BE-3S™" biocide from Halliburton Energy Services, Inc., of Duncan, Okla., and a 2-bromo-2-nitro-1,3-propanediol commercially available under the tradename "BE-6™" biocide from Halliburton Energy Services, Inc., of Duncan, Okla. In one embodiment, the bactericides are present in the treatment fluid in an amount in the range of from about 0.001% to about 1.0% by weight of the treatment fluid. In certain embodiments, when bactericides are used in the treatment fluids of the present invention, they may be added to the treatment fluid before the gelling agent is added.

The treatment fluids suitable for use in the present invention optionally may comprise a suitable crosslinker to crosslink the gelling agent comprising a diutan composition. Crosslinking may be desirable at higher temperatures and/or when the sand suspension properties of a particular fluid of the present invention may need to be altered for a particular purpose. In addition, crosslinking may be beneficial when using the treatment fluids suitable for use in the present invention to seal formation zones from loss of fluid from the well bore or when used as a pig for pipeline cleaning. Suitable crosslinkers include, but are not limited to, boron derivatives and salts thereof, potassium derivatives, including but not limited to, potassium periodate; ferric iron complexes and compounds; magnesium complexes and compounds; calcium complexes and compounds, barium complexes and compounds, copper complexes and compounds, aluminum complexes and compounds, cadmium complexes and compounds, zinc complexes and compounds, mercury complexes and compounds, nickel complexes and compounds, lead complexes and compounds, chrome (chromium) complexes and compounds, zirconium complexes and compounds; antimony complexes and compounds; and titanium complexes and compounds. Another example of suitable crosslinkers are those disclosed in U.S. patent application Ser. No. 11/502,656, the relevant disclosure of which is herein incorporated by reference. Any crosslinker that is compatible with the gelling agent may be used. One of ordinary skill in the art with the benefit of this disclosure will recognize when such crosslinkers are appropriate and what particular crosslinker will be most suitable.

The treatment fluids suitable for use in the present invention also may comprise suitable fluid loss control agents. Such fluid loss control agents may be particularly useful when a treatment fluid suitable for use in the present invention is being used in a fracturing application or in a fluid used to seal a formation from invasion of fluid from the well bore. Any fluid loss agent that is compatible with the treatment fluids suitable for use in the present invention is suitable for use in the present invention. Examples include, but are not limited to, starches, silica flour, gas bubbles (energized fluid or foam), benzoic acid, soaps, resin particulates, relative permeability modifiers, degradable gel particulates, diesel dispersed in fluid, and other immiscible fluids. Another example of a suitable fluid loss control additive is one that comprises a degradable material. Suitable examples of degradable materials include polysaccharides such as dextran or cellulose; chitins; chitosans; proteins; aliphatic polyesters; poly(lactides); poly(glycolides); poly(glycolide-co-lactides); poly(ε-caprolactones); poly(3-hydroxybutyrates); poly(3-hydroxybutyrate-co-hydroxyvalerates); poly(anhydrides); aliphatic poly(carbonates); poly(orthoesters); poly(amino acids); poly(ethylene oxides); poly(phosphazenes); derivatives thereof; or combinations thereof.

If included, a fluid loss additive may be added to a treatment fluid suitable for use in the present invention in an amount necessary to give the desired fluid loss control. In some embodiments, a fluid loss additive may be included in an amount of about 5 to about 2000 lbs/Mgal of the treatment fluid. In some embodiments, the fluid loss additive may be included in an amount from about 10 to about 50 lbs/Mgal of the treatment fluid. For some liquid additives like diesel, these may be included in an amount from about 0.01% to about 20% by volume; in some embodiments, these may be included in an amount from about 1% to about 10% by volume.

In certain embodiments, a stabilizer may optionally be included in the treatment fluids suitable for use in the present invention. It may be particularly advantageous to include a stabilizer if a chosen treatment fluid is experiencing a viscosity degradation. One example of a situation where a stabilizer might be beneficial is where the BHT of the well bore is sufficient by itself to break the treatment fluid without the use of a breaker. Suitable stabilizers include, but are not limited to, sodium thiosulfate, methanol, and salts such as formate salts and potassium chloride. Another example of a suitable stabilizer includes surfactants, such as those in U.S. patent application Ser. No. 11/418,617, the relevant disclosure of which is herein incorporated by reference. Such stabilizers may be useful when the treatment fluids of the present invention are utilized in a subterranean formation having a temperature above about 200° F. If included, a stabilizer may be added in an amount of from about 1 to about 50 lbs/Mgal of treatment fluid. In other embodiments, a stabilizer may be included in an amount of from about 5 to about 20 lbs/Mgal of treatment fluid. In certain embodiments where the stabilizer chosen is a salt, the stabilizer may be included in an amount of from about 5 lbs/Mgal to about saturation of the treatment fluid. In certain embodiments where the stabilizer chosen is a surfactant, the stabilizer may be included in an amount of from about 0.001% to about 5.0% of the treatment fluid.

Scale inhibitors may be added to the treatment fluids suitable for use in the present invention, for example, when a treatment fluid suitable for use in the present invention is not particularly compatible with the formation waters in the formation in which it is being used. This may include water soluble organic molecules with carboxylic acid, aspartic acid, maleic acids, sulphonic acids, phosphonic acid and phosphate esters groups including copolymers, ter-polymers, grafted copolymers, and derivatives thereof. The term "copolymer" as used herein is not limited to the combination of two polymers, but includes any combination of polymers, e.g., ter-polymers and the like. Examples of such compounds include aliphatic phosphonic acids such as diethylene triamine penta (methylene phosphonate) and polymeric species such as polyvinylsulphonate. The scale inhibitor may be in the form of the free acid but is preferably in the form of mono and polyvalent cation salts such as Na, K, Al, Fe, Ca, Mg, $NH_4$. Any scale inhibitor that is compatible with the treatment fluid in which it will be used in suitable for use in the present invention. An example of a suitable scale inhibitor is Scalechek LP-55™ scale inhibitor commercially available from Halliburton Energy Services in Duncan, Okla. Another example of a suitable scale inhibitor is LP-65™ scale inhibitor commercially available from Halliburton Energy Services in Duncan, Okla. If used, a scale inhibitor should be included in an amount effective to inhibit scale formation. Suitable amounts of scale inhibitors that may be included in the treatment fluids suitable for use in the present invention may range from about 0.05 to 100 gallons per about 1000 gallons of the treatment fluid.

The treatment fluid may be provided and introduced into the subterranean formation in certain embodiments of the present invention by any means known in the art. In some embodiments, placing the treatment fluid into the subterranean formation comprises placing the treatment fluid into a well bore penetrating the subterranean formation. The treatment fluid may be prepared at the job site, prepared at a plant or facility prior to use, or certain components of the treatment fluid (e.g., the base fluid and the gelling agent) may be pre-mixed prior to use and then transported to the job site. Certain components of the treatment fluid may be provided as a "dry mix" to be combined with the base fluid and/or other components prior to or during introducing the treatment fluid into the subterranean formation. In certain embodiments, the treatment fluid may be placed into the subterranean formation by placing the treatment fluid into a well bore that penetrates a portion of the subterranean formation.

In certain embodiments, the preparation of these treatment fluids of the present invention may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing. In some embodiments of the present invention, the diutan gelling agent may be mixed into the base fluid on the fly.

In certain embodiments, the treatment fluid may be introduced into the subterranean formation by pumping the treatment fluid into a well bore that penetrates a portion of the subterranean formation. In certain embodiments (e.g., fracturing operations), the treatment fluid may be introduced into the subterranean formation at or above a pressure sufficient to create or enhance one or more fractures in a portion of the subterranean formation.

In some embodiments, the treatment fluids suitable for use in the methods of the present invention may be placed in a subterranean formation utilizing a hydrajet tool. The hydrajet tool may be capable of increasing or modifying the velocity and/or direction of the flow of a fluid into a subterranean formation from the velocity and/or direction of the flow of that fluid down a well bore. One of the potential advantages of using a hydrajet tool is that a fluid may be introduced adjacent to and localized to specific areas of interest along the well bore without the use of mechanical or chemical barriers. Some examples of suitable hydrajet tools are described in U.S. Pat. Nos. 5,765,642, 5,494,103, and 5,361,856, the relevant portions of which are hereby incorporated by reference.

In some embodiments in which a hydrajet tool is used, the fluid(s) introduced through the hydrajet tool are introduced at a pressure sufficient to result in the creation of at least one new fracture in the formation. In one example of a hydrajetting operation carried out at an elevated pressure, a hydrajetting tool having at least one fluid jet forming nozzle is positioned adjacent to a formation to be fractured, and fluid is then jetted through the nozzle against the formation at a pressure sufficient to form a cavity, or slot therein to fracture the formation by stagnation pressure in the cavity. Because the jetted fluids would have to flow out of the slot in a direction generally opposite to the direction of the incoming jetted fluid, they are trapped in the slot and create a relatively high stagnation pressure at the tip of a cavity. This high stagnation pressure may cause a micro-fracture to be formed that extends a short distance into the formation. That micro-fracture may be further extended by pumping a fluid into the well bore to raise the ambient fluid pressure exerted on the formation while the formation is being hydrajetted. Such a fluid in the well bore will flow into the slot and fracture produced by the fluid jet and, if introduced into the well bore at a sufficient rate and pressure, may be used to extend the fracture an additional distance from the well bore into the formation.

The breaker comprising the acid composition may be provided separately or as a component of the treatment fluid in practicing the methods of the present invention. For example, the breaker comprising the acid composition may be added to the treatment fluid as it is pumped into a portion of a subterranean formation through a well bore penetrating the subterranean formation or the breaker comprising the acid composition may be placed into the subterranean formation after the placement of the treatment fluid into the subterranean formation. In some embodiments, a treatment fluid comprising a diutan composition may be used as a "sealing pill," i.e., to divert other treatment fluids away from certain regions of the subterranean formation. For example, a treatment fluid that comprises a diutan composition may form a physical barrier to prevent subsequently introduced treatment fluids from penetrating certain regions of the subterranean formation. At some point after the treatment fluid has performed its desired function, e.g., fluid diversion, a breaker of the present invention may be allowed to interact with the treatment fluid, so that the viscosity of the treatment fluid is reduced.

In certain embodiments in which the breaker is placed in the well bore after the placement of the treatment fluid in the well bore, the treatment fluid may be allowed to viscosity before the breaker is introduced. In some embodiments, at least a portion of the gelling agent may be or become a crosslinked gelling agent prior to, during, or subsequent to introducing the treatment fluid into the subterranean formation. For example, the crosslinking agent may be formulated to crosslink the gelling agent at some time after the treatment fluid is introduced into the subterranean formation.

Any particulates such as proppant and/or gravel that are commonly used in subterranean operations may be used in the present invention (e.g., sand, gravel, bauxite, ceramic materials, glass materials, polymer materials, wood, plant and vegetable matter, nut hulls, walnut hulls, cotton seed hulls, cement, fly ash, fibrous materials, composite particulates, hollow spheres and/or porous proppant). It should be understood that the term "particulate," as used in this disclosure, includes all known shapes of materials including substantially spherical materials, oblong, ellipsoid, rod-like, polygonal materials (such as cubic materials), mixtures thereof, and the like. In some embodiments, resin and/or tackifying agent coated particulates may be suitable for use in the treatment fluids suitable for use in the present invention. In addition, proppants that have been chemically treated or coated may also be used. The term "coated" does not imply any particular degree of coverage of the proppant particulates with the resin and/or tackifying agent. Examples of tackifying agents suitable for coating particulates are described in U.S. Pat. Nos. 5,853,048; 5,833,000; 5,582,249; 5,775,425; 5,787,986, 7,131,491 the relevant disclosures of which are herein incorporated by reference. An example of a suitable commercially available tackifying agent is the "SAND WEDGE" product sold by Halliburton Energy Services, Inc. of Duncan, Okla. Examples of resins suitable for coating particulates are described in U.S. Pat. Nos. 6,668,926; 6,729,404; and 6,962,200. An example of a suitable commercially available resin is the "EXPEDITE" product sold by Halliburton Energy Services, Inc. of Duncan, Okla.

In some embodiments in which the treatment fluid comprises particulates, the treatment fluid may be capable of suspending at least a portion of the particulates contained therein. Treatment fluids comprising particulates may be used in any method known in the art that requires the placement of particulates in a subterranean formation. For example, treatment fluids of the present invention that comprise particulates may be used, inter alia, to prop open one or more fractures in the subterranean formation and/or to form a gravel pack in or adjacent to a portion of the subterranean formation. In embodiments in which a treatment fluid suitable for use in the present invention comprises particulates, a breaker may be used to control the viscosity of the treatment fluid. It is thought that a breaker may reduce the ability of a treatment fluid to hold particulates in suspension by, inter alia, decreasing the viscosity of the treatment fluid.

The breaker may be allowed to at least partially decrease the viscosity of the treatment fluid at any point in the course of the treatment, for example, at the conclusion of a particular treatment of a subterranean formation in order to facilitate recovery of the fluid from the formation. In certain embodiments, the viscosity of the treatment fluid may be reduced and the treatment fluid may be recovered so as to deposit particulates therein in at least a portion of the subterranean formation and/or one or more fractures therein.

The methods of the present invention may be used in any subterranean operation involving the introduction of a treatment fluid into a subterranean formation wherein the viscosity of the treatment fluid is decreased, including, but not limited to, fracturing operations, including fracturing treatments such as those disclosed in U.S. patent application Ser. No. 11/506,703, the relevant disclosure of which is hereby incorporated by reference, gravel-packing operations, frac-packing operations, well bore cleanout operations, and the like. In certain embodiments of the present invention, the treatment fluid may be introduced into a portion of a subterranean formation so as to create a "plug" capable of diverting the flow of fluids that are introduced to the well bore at some point after the plug has formed (e.g., other treatment fluids) to other portions of the formation. In those embodiments, the breaker then may be allowed to reduce the viscosity of the fluid within the formation's pores, which may at least partially restore the flow of fluids through that portion of the subterranean formation.

To facilitate a better understanding of the present invention, the following examples of certain aspects of some embodiments are given. In no way should the following examples be read to limit, or define, the entire scope of the invention.

EXAMPLES

Example 1

To illustrate, inter alia, the breaking characteristics of a diutan composition with various breakers comprising an acid composition, the following particulate suspension tests were performed. Four samples of treatment fluids were prepared. A pre-mixture was prepared by mixing 100 mL of Angolan Synthetic Sea Water with 300 mL of filtered sodium bromide ("NaBr") brine having a density of 11.5 pounds per gallon (ppg). To prepare Sample 3, 0.6 grams of diutan was added to 200 mL of the pre-mixture and the combination was blended in a Waring blender for about 20 minutes. Then, 1.0 grams of formic acid was added and the combination was blended for about 10-15 minutes, resulting in a treatment fluid comprising diutan in an amount of about 25 pounds per 1000 gallons of brine and having a pH of about 2, as read across two submerged electrodes. To prepare Sample 4, 0.72 grams of diutan was added to 200 mL of pre-mixture and the combination was blended for about 20 minutes. Then, 1.0 grams of formic acid was added and the combination was blended for about 10-15 minutes, resulting in a treatment fluid containing about 30 pounds per 1000 gallons of brine and having a pH reading of about 2. To prepare Sample 2, 0.1 grams of sodium acetate was added to 100 mL of Sample 3, handshaking to combine. As prepared, Sample 2 contained diutan in an amount of about 25 pounds per 1000 gallons of brine and had a pH of about 2.3. To prepare Sample 1, 0.1 grams of sodium acetate was added to 100 mL of Sample 4, handshaking to combine. As prepared, Sample 1 contained diutan in an amount of about 30 pounds per 1000 gallons of brine and had a pH of about 2.3. The diutan used to prepare the samples was purchased under the tradename GEOVIS XT from Kelco Oil Field Group of Houston, Tex.

To assess the ability of each sample to suspend proppant, 35 grams of EconoProp™ (30/50 mesh), a commercially available proppant made by Carbo Ceramics of Irving, Tex., were added to about 50 mL of each sample. After preparing a proppant suspension, each sample was placed in a cylinder for observation and brought to 200° F. Thereafter, the volume of proppant suspended in each sample was measured over time. The proppant-settling data illustrated in FIG. 1 suggest that treatment fluids viscosified with a diutan gelling agent may break in response to only a small amount of breaker composition, and that sea water may not have an adverse effect on the treatment fluids of the present invention.

Example 2

Two samples of treatment fluids were prepared. Each sample comprised 35 grams of EconoProp™ (30/50 mesh), a commercially available proppant made by Carbo Ceramics, located in Irving, Tex., diutan in an amount of about 40 pounds per 1000 gallons of brine (0.5% weight of diutan per volume of treatment fluid), and sodium bromide brine in an amount to form a brine with a density of 11.5 pounds per gallon (ppg). The water used to prepare the samples was tap water obtained in Duncan, Okla. The diutan used to prepare the samples was purchased under the tradename GEOVIS XT from Kelco Oil Field Group of Houston, Tex. First, the diutan was mixed with the brine in a Waring blender and then the EconoProp was incorporated into the diutan solution by vigorous hand shaking for 1 minute. To Sample 5, 1.0 gram of acetic acid per 100 mLs of solution was added to achieve a final pH of 2.7. To Sample 6, 1 gram of acetic acid per 100 mLs of solution and 0.25 grams of sodium acetate per 100 mLs of solution were added to achieve a final pH of 3.3. After preparation, the temperature of Sample 5 was raised to 220° F. and the temperature of Sample 6 was raised to 240° F. Due to the high temperature, each sample was placed in a specialized cylinder known as a "pressure sight cell" to observe the height of the proppant suspended in the treatment fluid. In general, a pressurized sight cell is a brass cylinder designed to withstand high pressure and is equipped with portals through which the contents of the cylinder can be observed. Typically, pressurized sight cells are custom made to the purchaser's specifications.

Figure 2:
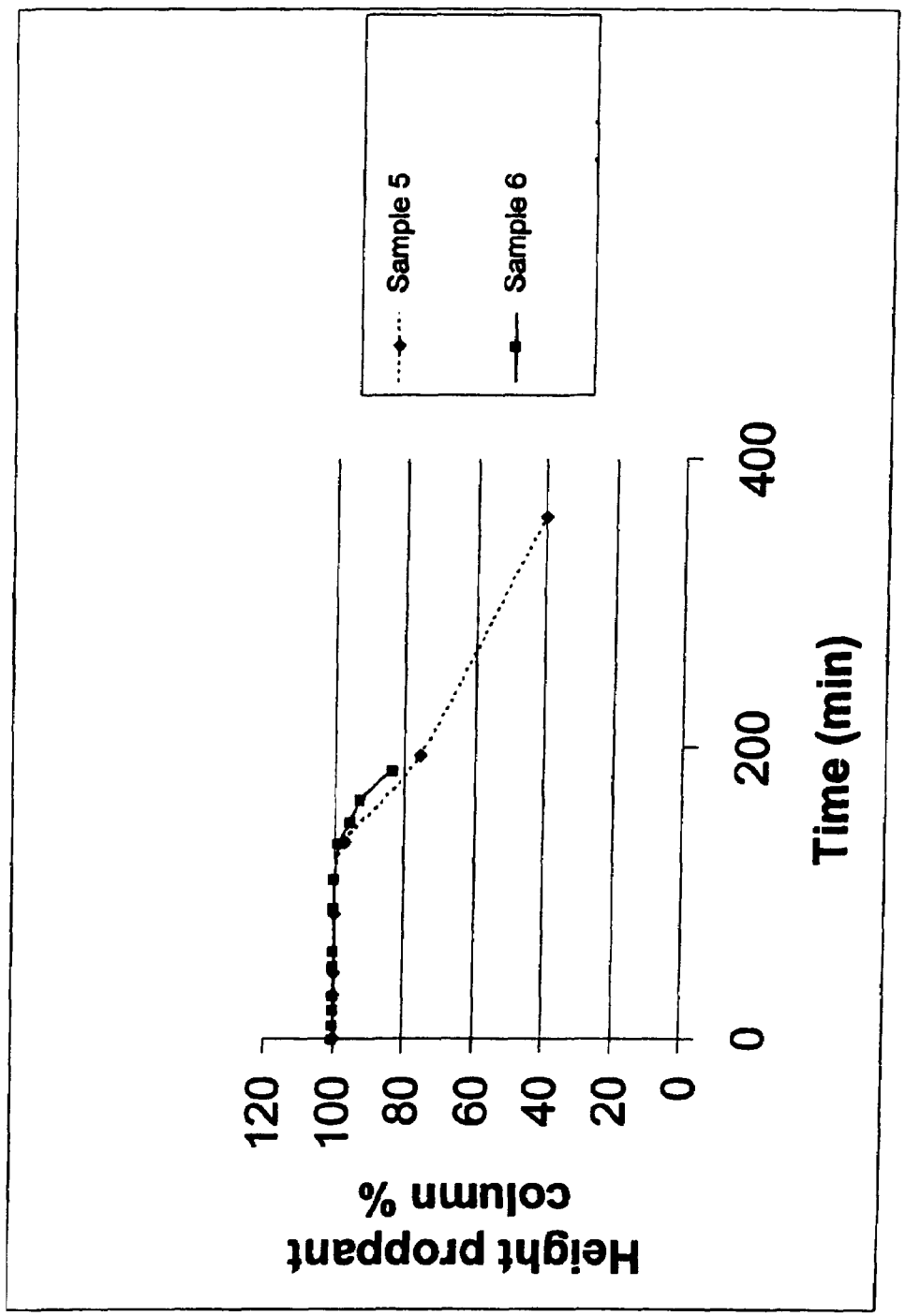
FIG. 2 illustrates proppant suspension data of various treatment fluids, including certain embodiments of the treatment fluids of the present invention.

FIG. 2 shows that within 400 minutes from the time the breaker was added to the sample treatment fluids, the level of proppant suspended in the treatment fluids fell to level less than 50% of the original height of the proppant suspended in the treatment fluid.

Example 3

Figure 3:
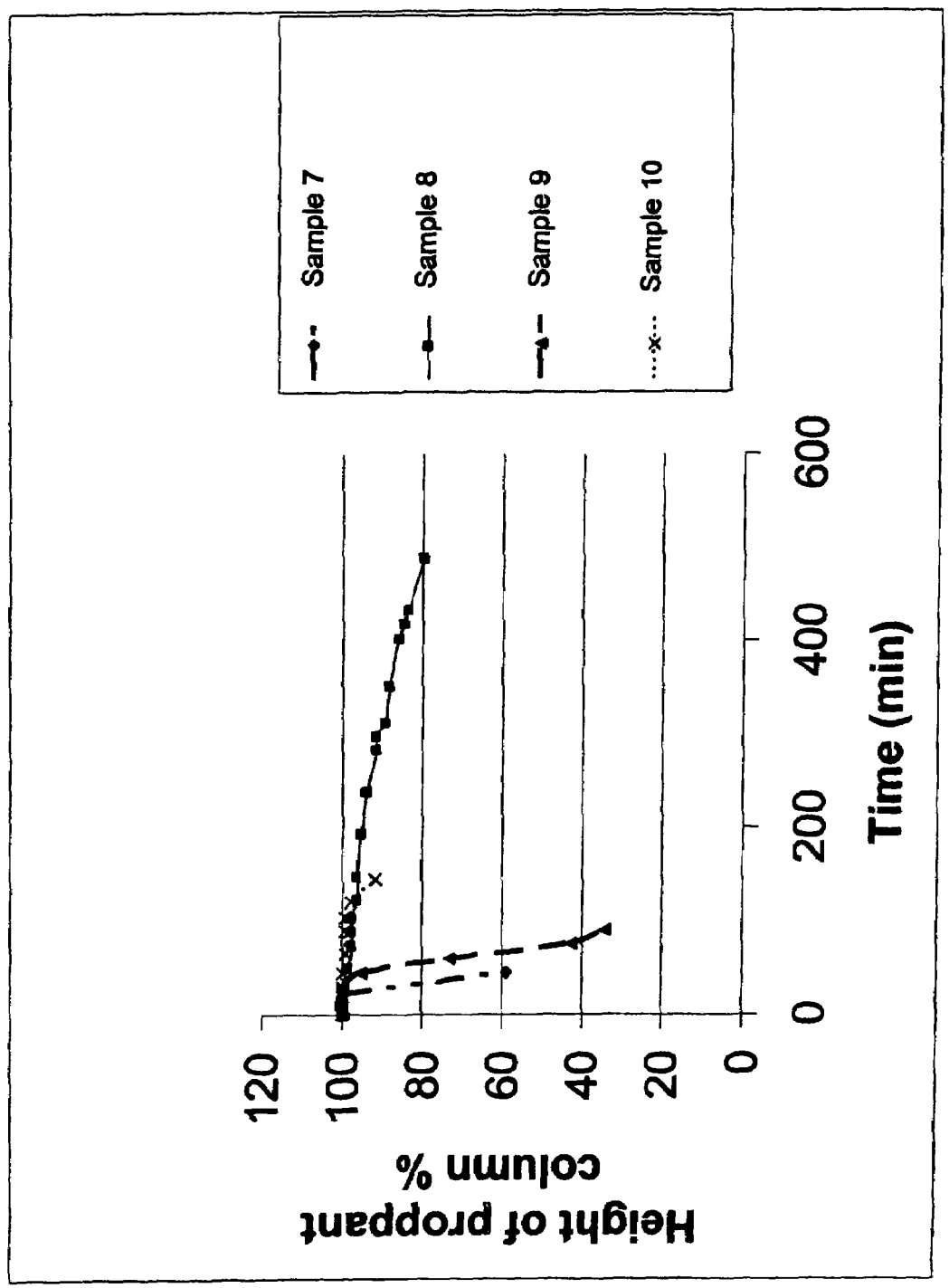
FIG. 3 illustrates proppant suspension data of various treatment fluids, including certain embodiments of the treatment fluids of the present invention.

Four samples of treatment fluids were prepared. Each sample comprised 35 grams of EconoProp™ (30/50 mesh), a commercially available proppant made by Carbo Ceramics, located in Irving, Tex., diutan in an amount of about 60 pounds per 1000 gallons of brine (0.75% diutan by weight per volume of treatment fluid), and sodium bromide in an amount to form a brine with a density of 11.5 pounds per gallon (ppg). The water used to prepare the samples was tap water obtained in Duncan, Okla. The diutan used to prepare the samples was purchased under the tradename GEOVIS XT from Kelco Oil Field Group of Houston, Tex. First, the diutan was mixed with the brine in a Waring blender and then the EconoProp was incorporated into the diutan solution by vigorous hand shaking for a period of 1 minute. To Samples 7, 9, and 10, 1.0 grams of acetic acid per 100 mLs of solution were added. Also, 0.25 grams, 0.5 grams, and 0.9 of grams sodium acetate per 100 mLs of solution were added to Sample 7, Sample 9, and Sample 10, respectively. The final room temperature pH readings across two electrodes showed that Sample 7 had a pH of 3.3, Sample 9 had a pH of 3.6, and Sample 10 had a pH of 3.8. No acetic acid or sodium acetate was added to Sample 8, which had a neutral pH of approximately 7.0. Immediately after preparation, each sample was placed in a pressure sight cylinder, as described in Example 2, and the temperatures of the samples was raised to 260° F. The volume of proppant suspended in each sample was observed over time. FIG. 3 compares the decrease in the level of proppant suspended in each sample treatment fluids within 600 minutes from the time the breaker was added to the sample treatment fluid.

Example 4

To study the ability of a formation to regain permeability after being treated with a treatment fluid comprising a diutan composition, the following procedure was performed. Experimental rock cores of Aloxite were produced from aluminum oxide purchased from Filtros Ltd. To test the initial permeability of the experimental rock cores, flow tests were carried out in multipressure-tap Hassler sleeves. The flow tests referred to herein loosely conformed with the flow test procedures described in Eoff, Larry, et al., *Development of a Hydrophobically Modified Water-Soluble Polymer as a Selective Bullhead System for Water-Production Problem*, Society of Petroleum Engineers Paper No. 80206. The pre-treatment flow tests showed that the experimental rock cores had an initial permeability of about 1200 millidarcies ("mD"). Sample treatment fluids viscosified with a diutan gelling agent were prepared with (0.5% weight of diutan per volume of sodium bromide brine). The diutan used in the samples was purchased under the tradename GEOVIS XT from Kelco Oil of Houston, Tex. Each sample of treatment fluid was combined with either a breaker system comprising 2% formic acid or an oxidizing breaker system comprising 0.75% VICON NF™ breaker (by weight) and 0.01% HT BREAKER™ (by weight), both commercially available from Halliburton Energy Services, Inc. of Duncan, Okla. The combination treatment fluid-breaker solution was then flowed into an experimental rock core, and the temperature of the entire system was maintained at 200° F. while the treatment fluid-breaker solution was allowed to stay in the experimental rock core for approximately twenty hours (e.g., sufficient time to allow the breaker to degrade the diutan in the treatment fluid). Then the treatment fluid-breaker solution was flowed out of the experimental rock core. A standard brine was once again flowed into the experimental rock core to determine the final post-treatment permeability of the rock core. The final permeability and the initial permeability of the rock core were used to calculate the amount of permeability regained by the rock core after the viscosified treatment fluid was broken. The results of this test are displayed in Table 1. Lower permeability regain may indicate, inter alia, that more damage remains in the rock core, e.g., residual plugging or blocking of the core by the viscosified treatment fluid. It is believed that the greater permeability regain achieved by acidic breakers in comparison to oxidizing breakers is due to, inter alia, a difference in the way the acidic breakers degrade the bacterial bodies in the treatment fluid that are responsible for producing the diutan molecules.

TABLE 1

| Breaker Comprising: | Permeability Regain | |
|---|---|---|
| | Test 1 | Test 2 |
| Oxidizing Agents (VICON NF ™ and HT BREAKER ™) | 7% | <20% |
| Acid Composition (2% formic acid) | 83% | 88% |

Example 5

Figure 4:
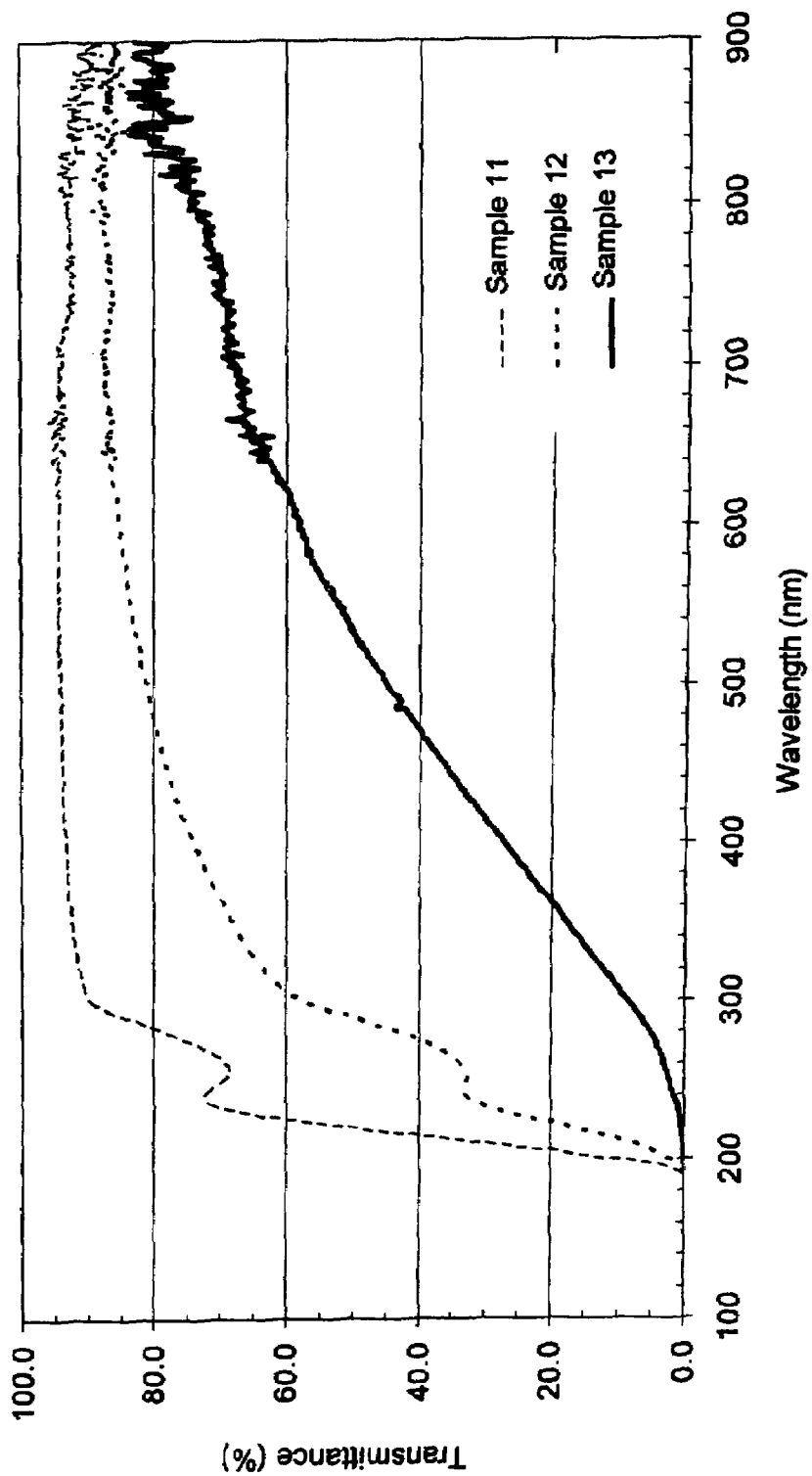
FIG. 4 illustrates the transmittance properties of a treatment fluid of the present invention.

To illustrate, inter alia, the transmittance characteristics of a suitable diutan of the present invention, the following procedure was performed. Three sample solutions were prepared by dissolving 0.2 grams of pure diutan powder in 200 mL of deionized water. Sample 11 contained 0.2 grams of "FDP-S849-07," a clarified diutan available from Halliburton Energy Services, Inc., in 200 mL of deionized water. Sample 12 contained 0.2 grams of "FDP-S848-07," a clarified diutan available from Halliburton Energy Services, Inc., in 200 mL of deionized water. Sample 13 contained 0.2 grams of "GEO-VIS XT," a nonclarified diutan available from Kelco Oil Field Group, in 200 mL of deionized water. For each sample solution, the deionized water was placed in a Waring blender and the diutan powder was slowly incorporated into the water over approximately ten seconds at 800 to 1,000 revolutions per minute ("rpm"). Each sample was then mixed in the blender for approximately one hour at 1,500 rpm. After approximately one hour, each sample was then centrifuged at room temperature at 1,000 rpm on a bench top centrifuge for approximately fifteen minutes to remove gas bubbles before measuring the transmittance. The transmittance measurement of each sample was then obtained by placing the sample in a UV-Visible spectrophotometer (e.g. Agilent 8453, Agilent Technologies Co.) in a 1 cm-thick quartz cell (Open-Top UV quartz cell 10 mm, 3.0 ml Vol.) between 190-900 nm wavelength at room temperature. The background spectrum was measured through air, not an empty cell, allowing this spectrum to be automatically subtracted from the sample spectrum. FIG. 4 illustrates the transmittance properties of a treatment fluid of the present invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
    providing a treatment fluid comprising a base fluid and a gelling agent that comprises a clarified diutan composition that has a transmittance at 600 nm wavelength of at least about 65% in a 1 centimeter optical cell, at 0.1% concentration in deionized water, wherein the treatment fluid is not foamed, and wherein the gelling agent does not comprise clarified xanthan;
    providing a breaker that comprises an acid composition;
    contacting the treatment fluid with the breaker;
    allowing the breaker to interact with the treatment fluid; and
    allowing the viscosity of the treatment fluid to decrease.

2. The method of claim 1 wherein the acid composition is selected from the group consisting of: an acid, an acid generating compound, and combinations thereof.

3. The method of claim 1 wherein the acid composition comprises an acid selected from the group consisting of: formic acid, acetic acid, carbonic acid, citric acid, glycolic acid, lactic acid, ethylenediaminetetraacetic acid, hydroxyethyl ethylenediamine triacetic acid, hydrochloric acid, hydrofluoric acid, p-toluenesulfonic acid, and combinations thereof.

4. The method of claim 1 wherein the acid composition comprises an acid generating compound selected from the group consisting of: esters, aliphatic polyesters, ortho esters, poly(ortho esters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate and formate esters of pentaerythritol, copolymers thereof, derivatives thereof, and combinations thereof.

5. The method of claim 1 wherein the breaker further comprises a pH-adjuster.

6. The method of claim 5 wherein the pH-adjuster is selected from the group consisting of: sodium formate, potassium formate, sodium acetate, potassium acetate, sodium citrate, potassium citrate, sodium glycolate, potassium glycolate, sodium maleate, potassium maleate, sodium phosphate, potassium phosphate, potassium dihydrogen phosphate, cesium formate, combinations thereof, and derivatives thereof.

7. The method of claim 5 wherein the pH-adjuster is present in an amount sufficient to maintain or adjust the pH of the fluid to a pH in the range of from about 1 to about 5.

8. A method comprising:
    providing a treatment fluid, wherein the treatment fluid is not foamed and comprises:
        a base fluid,
        a gelling agent that comprises a clarified diutan composition that has a transmittance at 600 nm wavelength of at least about 65% in a 1 centimeter optical cell, at 0.1% concentration in deionized water, wherein the gelling agent does not comprise clarified xanthan, and
        a breaker that comprises an acid composition;
    introducing the treatment fluid into at least a portion of the subterranean formation; and
    allowing the viscosity of the treatment fluid to decrease through an interaction of the breaker with the gelling agent.

9. The method of claim 8 wherein the gelling agent is present in the treatment fluid in an amount in the range of from about 0.25 lbs/Mgal to about 200 lbs/Mgal.

10. The method of claim 8 wherein the acid composition is selected from the group consisting of: an acid, an acid generating compound, and combinations thereof.

11. The method of claim 8 wherein the acid composition comprises an acid selected from the group consisting of: formic acid, acetic acid, carbonic acid, citric acid, glycolic acid, lactic acid, ethylenediaminetetraacetic acid, hydroxyethyl ethylenediamine triacetic acid, hydrochloric acid, hydrofluoric acid, p-toluenesulfonic acid, and combinations thereof.

12. The method of claim 8 wherein the acid composition comprises an acid generating compound selected from the group consisting of: esters, aliphatic polyesters, ortho esters, poly(ortho esters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate and formate esters of pentaerythritol, copolymers thereof, derivatives thereof, and combinations thereof.

13. The method of claim 8 wherein the treatment fluid further comprises a pH-adjuster selected from the group consisting of: sodium formate, potassium formate, sodium acetate, potassium acetate, sodium citrate, potassium citrate, sodium glycolate, potassium glycolate, sodium maleate, potassium maleate, sodium phosphate, potassium phosphate, potassium dihydrogen phosphate, cesium formate, combinations thereof, and derivatives thereof.

14. A method of stimulating a portion of a subterranean formation comprising:
   providing a treatment fluid that comprises a base fluid and a gelling agent that comprises a clarified diutan composition that has a transmittance at 600 nm wavelength of at least about 65% in a 1 centimeter optical cell, at 0.1% concentration in deionized water, wherein the treatment fluid is not foamed, and wherein the gelling agent does not comprise clarified xanthan;
   providing a breaker that comprises an acid composition;
   introducing the treatment fluid into a portion of the subterranean formation at or above a pressure sufficient to create or enhance one or more fractures in the portion of the subterranean formation;
   allowing the breaker to interact with the treatment fluid; and
   allowing the viscosity of the treatment fluid to decrease.

15. The method of claim 14 wherein the acid composition is selected from the group consisting of: an acid, an acid generating compound, and combinations thereof.

16. The method of claim 14 wherein the treatment fluid further comprises a pH-adjuster selected from the group consisting of: sodium formate, potassium formate, sodium acetate, potassium acetate, sodium citrate, potassium citrate, sodium glycolate, potassium glycolate, sodium maleate, potassium maleate, sodium phosphate, potassium phosphate, potassium dihydrogen phosphate, cesium formate, combinations thereof, and derivatives thereof.

* * * * *